(12) United States Patent  
Engelhardt et al.

(10) Patent No.: US 8,274,266 B2  
(45) Date of Patent: Sep. 25, 2012

(54) SWITCH MODE POWER SUPPLY WITH DYNAMIC TOPOLOGY

(75) Inventors: Michael Thomas Engelhardt, Sunnyvale, CA (US); Randy Guy Flatness, Los Gatos, CA (US)

(73) Assignee: Linear Technology Corporation, Milpitas, CA (US)

( * ) Notice: Subject to any disclaimer, the term of this patent is extended or adjusted under 35 U.S.C. 154(b) by 543 days.

(21) Appl. No.: 12/541,596

(22) Filed: Aug. 14, 2009

(65) Prior Publication Data

US 2011/0037446 A1   Feb. 17, 2011

(51) Int. Cl.  
*G05F 1/24* (2006.01)

(52) U.S. Cl. ............................... 323/259; 323/271

(58) Field of Classification Search ............ 323/259, 323/263, 344, 271  
See application file for complete search history.

(56) References Cited

U.S. PATENT DOCUMENTS

| | | | | |
|---|---|---|---|---|
| 6,100,675 | A * | 8/2000 | Sudo .............................. | 323/282 |
| 6,166,527 | A |  12/2000 | Dwelley et al. | |
| 6,452,368 | B1 * | 9/2002 | Basso et al. .................. | 323/282 |
| 6,674,274 | B2 | 1/2004 | Hobrecht et al. | |
| 7,432,689 | B2 | 10/2008 | Miller et al. | |
| 7,439,720 | B2 | 10/2008 | Nguyen et al. | |
| 7,495,419 | B1 | 2/2009 | Ju | |
| 2006/0055384 | A1 | 3/2006 | Jordan et al. | |
| 2006/0176038 | A1 * | 8/2006 | Flatness et al. ............... | 323/282 |
| 2008/0094097 | A1 | 4/2008 | Migliavacca | |
| 2008/0297122 | A1 | 12/2008 | Zhou et al. | |

OTHER PUBLICATIONS

International Preliminary Report issued in International Application No. PCT/US2010/044660 dated Feb. 14, 2012.

* cited by examiner

*Primary Examiner* — Harry Behm  
*Assistant Examiner* — Matthew Grubb  
(74) *Attorney, Agent, or Firm* — McDermott Will & Emery LLP

(57) ABSTRACT

A power supply system has an inductive device, a plurality of switching devices for providing connection of the inductive device to input and output nodes and a ground node, and a switch driver circuit for driving the switching devices so as to enable the power supply to operate in a boost mode to increase the input voltage, in a buck mode to decrease the input voltage, and in a solid-state flyback mode to transfer between the boost mode and the buck mode. In the solid-state flyback mode, the switching devices are controlled to provide switching of the inductive device between an input state in which the inductive device is connected between the input node and the ground node, and an output state in which the inductive device is connected between the ground node and the output node.

35 Claims, 7 Drawing Sheets

SWITCH MODE POWER SUPPLY WITH DYNAMIC TOPOLOGY

TECHNICAL FIELD

This disclosure relates to power supply systems, and more particularly, to circuitry and methodology for controlling switching topology of a switch mode power supply in accordance with a mode of operation.

BACKGROUND ART

A switch mode power supply (SMPS) is an electronic power supply unit (PSU) that incorporates a switching regulator. In particular, a SMPS may include a buck-boost voltage regulator capable of converting from input voltages above, below, or equal to the controlled output voltage, respectively performing buck mode regulation, boost mode regulation, or buck-boost mode regulation. Buck-boost regulator architecture typically is provided for power supplies used for automotive applications, lap-top computers, telecom equipment and distributed power systems. For example, the LTC3440 buck-boost converter manufactured by Linear Technology Corporation, assignee of the present application, includes four switches, two of which are connected to the input side of an inductor, and the other two are connected to the output side. In accordance with the level of voltage output to be controlled and the level of voltage input, the regulator has the capability of assuming a plurality of operation states in which the switches are sequentially activated or deactivated, to connect the inductor to the input, the output, and/or a common ground connection.

Another example is the LTC3780 four-switch buck-boost switching regulator manufactured by Linear Technology Corporation. This is a current mode regulator that provides an output voltage above, below or equal to the input voltage. The operating mode of the controller is determined through the voltage applied to the Forced Continued Control Input pin. The power switches are controlled so as to provide continuous transfers between modes of operation.

However, implementation of known buck-boost switching regulators requires a complex circuit arrangement. Also, typical buck-boost regulator architecture does not allow peak current mode control and Burst Mode® operation.

Hence, there is a need for simpler circuitry and methodology for enabling a voltage regulator to switch between buck and boost modes while allowing peak current mode control and Burst Mode operation.

SUMMARY OF THE DISCLOSURE

The present disclosure offers novel circuitry and methodology for producing a regulated output voltage at an output node in response to an input voltage at an input node.

In accordance with one aspect of the disclosure, a power supply system has an inductive device, a plurality of switching devices for providing connection of the inductive device to the input and output nodes and a ground node, and a switch driver circuit for driving the switching devices so as to enable the power supply to operate in a boost mode to increase the input voltage, in a buck mode to decrease the input voltage, and in a solid-state flyback mode to transfer between the boost mode and the buck mode. In the solid-state flyback mode, the switching devices are configured to provide switching of the inductive device between an input state in which the inductive device is connected between the input node and the ground node, and an output state in which the inductive device is connected between the ground node and the output node.

Control circuitry may be provided for controlling the switch driver circuit in response to a current in the inductive device. In particular, the control circuitry may be configured for controlling the switch driver circuit in the solid-state flyback mode based on a value of a peak current in the inductive device.

In accordance with an embodiment of the disclosure, the switching devices may include:
a first switching device for providing connection of the inductive device to the input node,
a second switching device for providing a connection of the inductive device to the ground node,
a third switching device for providing a connection of the inductive device to the ground node, and
a fourth switching device for providing a connection of the inductive device to the output node.

For example, the first to fourth switching devices may be transistor devices. Alternatively, the first and third switching devices may be transistor devices, and the second and fourth switching devices may be diode devices.

In the input state of the solid-state flyback mode, the first and third switching devices may be in a closed state, and the second and fourth switching devices may be in an open state. In the output state of the solid-state flyback mode, the first and third switching devices may be in an open state, and the second and fourth switching devices may be in a closed state.

The switch driver circuit may set the input state of the solid-state flyback mode in response to a clock signal. The output state of the solid-state flyback mode may be set based on a value of a peak current in the inductive device.

In accordance with one exemplary embodiment, a voltage detection circuit may be provided for supplying the switch driver circuit with a mode control signal based on relationship between the input and output voltages.

The voltage detection circuit may provide a buck mode signal requesting the switch driver circuit to operate in the buck mode when the input voltage is above the output voltage by a first threshold value.

The voltage detection circuit may provide a boost mode signal requesting the switch driver circuit to operate in the buck mode when the input voltage is below the output voltage by a second threshold value.

The voltage detection circuit may provide a solid-state flyback mode signal requesting the switch driver circuit to operate in the solid-state flyback mode when a difference between the input voltage and the output voltage is less than a third threshold value.

In accordance with another exemplary embodiment, a duty cycle detection circuit may be provided for supplying the switch driver circuit with a mode control signal based on a duty cycle D of a signal that controls switching of the switching devices.

The duty cycle detection circuit may compare the duty cycle D with first, second, third and fourth threshold levels Dth1, Dth2, Dth3 and Dth4, respectively, where Dth1>Dth2>Dth3>Dth4.

The duty cycle detection circuit may provide a solid-state flyback mode signal requesting the switch driver circuit to operate in the solid-state flyback mode when the duty cycle D is above the first threshold level Dth1 or below the fourth threshold level Dth4.

The duty cycle detection circuit may assert a buck mode signal requesting the switch driver circuit to operate in the buck mode when the duty cycle D is below the third threshold level Dth3.

The duty cycle detection circuit may provide a boost mode signal requesting the switch driver circuit to operate in the boost mode when the duty cycle D is above the second threshold level Dth2.

In accordance with a further exemplary embodiment, the power supply system may operate in the Burst Mode®, in which the clock signal may be disabled in response to a signal indicating that a light load is connected to the output node.

For example, the clock signal may be disabled based on the output voltage. In accordance with an alternative embodiment, the clock signal may be disabled based on an output of an error amplifier that compares the output voltage with a reference voltage.

Further, a limiter may be provided to limit the minimum peak value of the current in the inductive device.

In the Burst Mode, the switching devices may be configured to prevent a current from flowing from the output node through the inductive device to the ground node.

In accordance with a method of the present disclosure, the following steps are carried out to regulate an output voltage in response to an input voltage in a voltage regulator comprising an inductive element:

operating the voltage regulator in a buck mode to reduce the input voltage if the input voltage is above the output voltage, operating the voltage regulator in a boost mode to increase the input voltage if the input voltage is below the output voltage, and operating the voltage regulator in a solid-state flyback mode during a transition between the buck mode and the boost mode.

In the solid-state flyback mode, the inductive device is switched between an input state in which the inductive element is connected between an input of the voltage regulator and a common node, and an output state in which the inductive element is connected between the common node and an output of the voltage regulator.

The inductive element may be switched between the input state and the output state based on a value of the peak current.

In accordance with a further aspect of the disclosure, a switching regulator for producing a regulated output voltage at an output node in response to an input voltage at an input node comprises:

an inductive device, a plurality of switching devices for providing connection of the inductive device to the input and output nodes and a common node, and a switch driver circuit for driving the switching devices so as to enable the power supply to operate in a solid-state flyback mode.

In the solid-state flyback mode, the switching devices may be configured to provide switching of the inductive device between an input state in which the inductive device is connected between the input node and the common node, and an output state in which the inductive device is connected between the common node and the output node. The inductive device may be switched based on a value of the peak current.

In accordance with another aspect of the invention, a power supply system operating in a buck mode and in a boost mode for producing a regulated output voltage at an output node in response to an input voltage at an input node, comprises an inductive device, a switching circuitry configured for providing connection of the inductive device to support operation in a required mode of operation, an error amplifier for comparing the output voltage with a reference voltage to produce an error signal, a comparator responsive to the error signal and a peak current in the inductor to control the output voltage, and a transconductance control loop for controlling a relation between the peak current and an output signal of the error amplifier in accordance with the mode of operation.

The switching circuitry may be configured to enable the system to operate in an intermediate mode of operation between the buck mode and the boost mode, and the transconductance control loop may be configured for adjusting the relation between the peak current and the output signal of the error amplifier when the system switches between the intermediate mode and the buck or boost mode.

In the intermediate mode, the switching circuitry may be configured to provide switching of the inductive device between an input state in which the inductive device is connected between the input node and the ground node, and an output state in which the inductive device is connected between the ground node and the output node.

In accordance with an exemplary embodiment, a current sensor may be coupled to the inductive device for sensing the peak current in the inductive device. The transconductance control loop may include a variable-gain amplifier coupled between the current sensor and the comparator, and having a gain adjusted when the system switches between the intermediate mode and the buck or boost mode.

In accordance with another exemplary embodiment, the switching circuitry may include an input switching circuit coupled to connect the input node and the inductive device, and configured to produce a value representing a current flowing through the input switching circuit. The transconductance control loop may include a variable-gain amplifier coupled between the input switching circuit and the comparator, and having a gain adjusted when the system switches between the intermediate mode and the buck or boost mode.

In accordance with a further exemplary embodiment, a controlled current sensor may be coupled to the inductive element for sensing the peak current in the inductive element. The sensor may be configured to supply the comparator with an output value representing the peak current. The output value may be adjusted when the system switches between the intermediate mode and the buck or boost mode.

In accordance with another exemplary embodiment, the switching circuitry may include an input switching circuit coupled to connect the input node to the inductive element. The input switching circuit may be configured to supply the comparator with an output value representing a current in the input switching circuit. The output value may be adjusted when the system switches between the intermediate mode and the buck or boost mode.

The transconductance control loop may be configured so as to reduce a value of a peak inductor current signal supplied to the comparator in the intermediate mode compared to the peak inductor current signal supplied in the buck or boost mode.

In accordance with a further aspect of the disclosure, the following steps are carried out to regulate an output voltage in response to an input voltage in a voltage regulator comprising an inductive element and an error amplifier for comparing the output voltage with a reference voltage:

operating the voltage regulator in a buck mode to reduce the input voltage if the input voltage is above the output voltage, operating the voltage regulator in a boost mode to increase the input voltage if the input voltage is below the output voltage, operating the voltage regulator in an intermediate mode during switching between the buck mode and the boost mode, and adjusting a relation between a peak current in the inductive element and an output signal of the error amplifier when the voltage regulator switches between the intermediate mode and the buck or boost mode.

In the intermediate mode, the inductive element may be switched between an input state in which the inductive element is connected between an input of the voltage regulator and a common node, and an output state in which the inductive element is connected between the common node and an output of the voltage regulator.

For example, the adjusting step may include adjusting a gain of an amplifier that amplifies a signal representing the peak current in the inductive element.

Alternatively, the adjusting step may include adjusting a gain of an amplifier that amplifies a signal representing a current in a switching circuit that connects an input of the voltage regulator to the inductive element.

Also, the adjusting step may include adjusting a value of a signal representing the peak current in the inductive element.

Further, the adjusting step may include adjusting a value of a signal representing a current in a switching circuit that connects an input of the voltage regulator to the inductive element.

The adjusting step may be carried out so as to reduce a value of a signal representing the peak current in the inductive element, when the voltage regulator switches from the buck or boost mode into the intermediate mode.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The drawing figures depict concepts by way of example, not by way of limitations. In the figures, like reference numerals refer to the same or similar elements.

DETAILED DESCRIPTION OF THE EMBODIMENTS

The present disclosure will be made with examples of specific switching regulator arrangements. It will become apparent, however, that the concepts described herein are applicable to any switching regulator for providing an output voltage or current above, below or equal to the input voltage or current.

Figure 1:
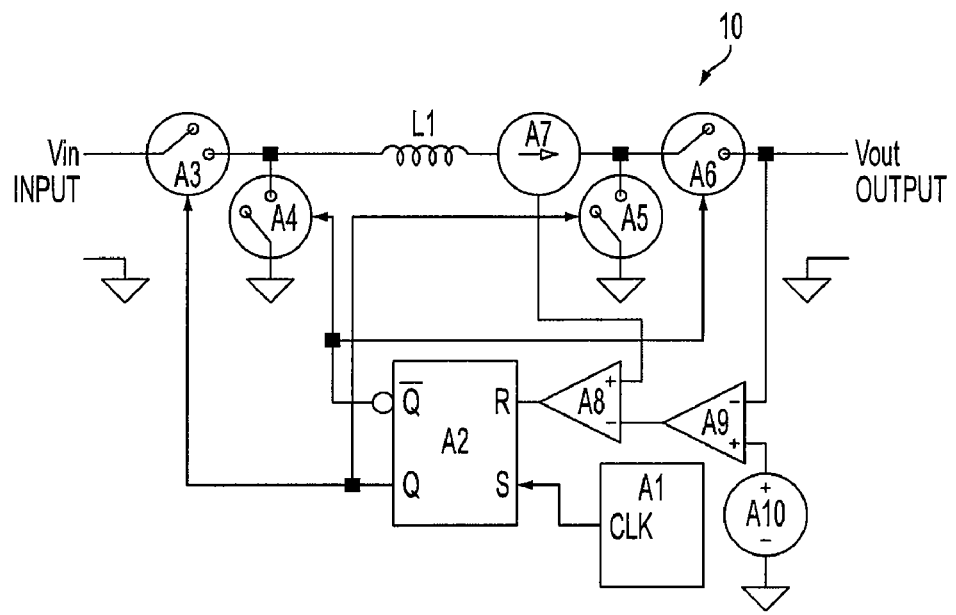
FIG. 1 is a diagram illustrating an example of a solid-state flyback topology of the present disclosure.

FIG. 1 illustrates a concept of a solid-state flyback mode of operation in a buck-boost switching regulator 10 in accordance with the present disclosure. The buck-boost switching regulator 10 may be a peak current mode controller that regulates a voltage Vout at its output by comparing the output voltage Vout with a voltage Vin provided at its input. In particular, when the input voltage Vin is above the output voltage Vout, the switching regulator 10 operates in a buck mode to reduce the input voltage to a level of the regulated output voltage. When the input voltage Vin is below the output voltage Vout, the regulator 10 operates in a boost mode to increase the input voltage Vin to the output level. When in the buck mode, the input voltage Vin drops to a level close to the output voltage Vout, or in the boost mode, the input voltage Vin increases to a level close to the output voltage Vout, the buck-boost switching regulator 10 operates in a solid-state flyback mode that provides a simple way of switching between the buck mode and the boost mode.

More specifically, the buck-boost switching regulator 10 may include a clock oscillator A1 producing a series of clock pulses CLK supplied to a set input S of a flip-flop A2 that controls switching of switches A3, A4, A5 and A6. In particular, control terminals of switches A3 and A5 are responsive to output Q of the flip-flop A2, and control terminals of switches A4 and A6 are responsive to output Q/ of the flip-flop A2. The switches A3, A4, A5 and A6 provide switching of an inductor L1 between input and output nodes of the regulator 10 in a desired manner.

In particular, switch A3 is coupled to an input node of the inductor L1 to connect the inductor L1 to the input of the regulator 10. Switch A4 is coupled to the input node of the inductor L1 to connect the inductor L1 to a ground node. Switch A5 is coupled to an output node of the inductor L1 to connect the inductor L1 to the output of the regulator 10. Switch A6 is coupled to the output node of the inductor L1 to connect the inductor L1 to a ground node. A current sensor A7 is coupled in series with the inductor L1 to determine the current flowing through the inductor L1.

When the flip-flop A2 is set by a clock pulse CLK, the Q output goes to a TRUE state to close switches A3 and A5, and the Q/ output goes to a FALSE state to open switches A4 and A6. As a result, the inductor L1 is connected between the input of the regulator 10 and the ground.

When the flip-flop A2 is reset by a signal at its reset input R, the Q output goes to a FALSE state to open switches A3 and A5, and the Q/ output goes to a TRUE state to close switches A4 and A6. In this case, the inductor L1 is connected between the output of the regulator 10 and the ground.

The current sensor A7 may produce a voltage representing a peak current in the inductor L1. This voltage is supplied to a non-inverting input of a voltage comparator A8 having an output connected to the reset input R of the flip-flop A2. An inverting input of the voltage comparator A8 is connected to an output of an error amplifier A9 that compares the voltage Vout at the output of the regulator 10 with a reference voltage Vref provided by a reference voltage source A10. One skilled in the art would realize that instead of comparing the voltage Vout with the reference voltage Vref, the error amplifier A9 may compare any signal representing the output voltage Vout with any reference signal.

Hence, the comparator A8 compares a peak current signal representing the peak current in the inductor L1 with an error signal corresponding to a difference between the output voltage Vout and the reference voltage Vref. When the peak current signal is ramped up to a level of the error signal, the output of the comparator A8 goes to a TRUE state resetting the flip-flop A2. In response to the reset signal, the input Q/ of the flip-flop A2 becomes TRUE closing switches A4 and A6, and the input Q becomes FALSE opening switches A3 and A5.

Thus, in response to the ramped up peak current, the inductor L1 is connected between the output of the regulator 10 and the ground. This state is maintained until the next clock signal CLK sets the flip-flop A2 to control the switches A3, A4, A5 and A6 so as to connect the inductor L1 between the input of the regulator 10 and the ground. Thereafter, the peak current in the inductor is monitored to reset the flip-flop A2 when the peak up current is ramped up to a pre-determined level.

Accordingly, the solid-state flyback topology illustrated in FIG. 1 supports switching of the inductor L1 between an input state in which the inductor L1 is connected between the input of the regulator 10 and the ground, and an output state in which the inductor L1 is connected between the output of the regulator 10 and the ground. As discussed above, the switching of the inductor L1 is carried out in response to the peak current.

Figure 2:
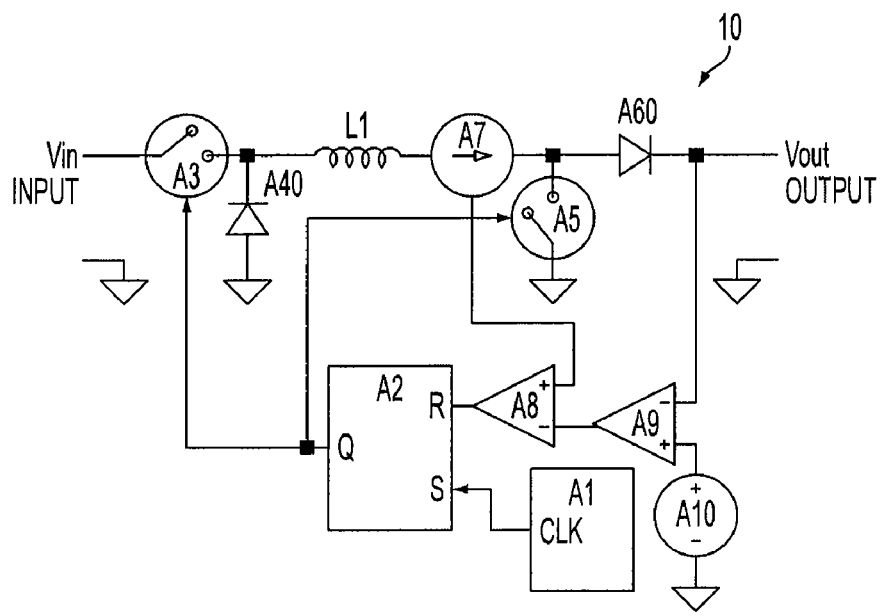
FIG. 2 illustrates another example of a solid-state flyback topology of the present disclosure.

Switches A3 to A6 may be implemented by a controlled switching devices such as transistors. Alternatively, as shown in FIG. 2 that illustrates another embodiment of the solid-state flyback topology of the present disclosure, diodes A40 and A60 may be connected instead of the switches A4 and A6. The circuit in FIG. 2 operates in a manner similar to operation of the circuit in FIG. 1. However, the diodes A40 and A60 are arranged so as to connect the inductor L1 between the output of the regulator 10 and the ground when the flip-flop A2 is reset by the output signal of the voltage comparator A8. When the flip-flop A2 is set by the CLK signal, the TRUE signal at the output Q closes the switches A3 and A5 to connect the inductor L1 between the input of the regulator 10 and the ground. When the flip-flop A2 is reset, the FALSE signal at the output Q opens the switches A3 and A5. As a result, the inductor current will flow from the diode A40 via the inductor L1, current sensor A7 and the diode A60 to the output of the regulator 10.

In general, the topology in FIG. 1 using transistors A4 and A6 are more efficient than the topology in FIG. 2 using diodes A40 and A60 because the voltage drop across the transistors is smaller than the voltage drop across the diodes. However, at light loads at the output of the regulator 10, the solid-state flyback topology in FIG. 2 using diodes A40 and A60 may become more efficient that the transistor-based topology in FIG. 1.

Figure 3:
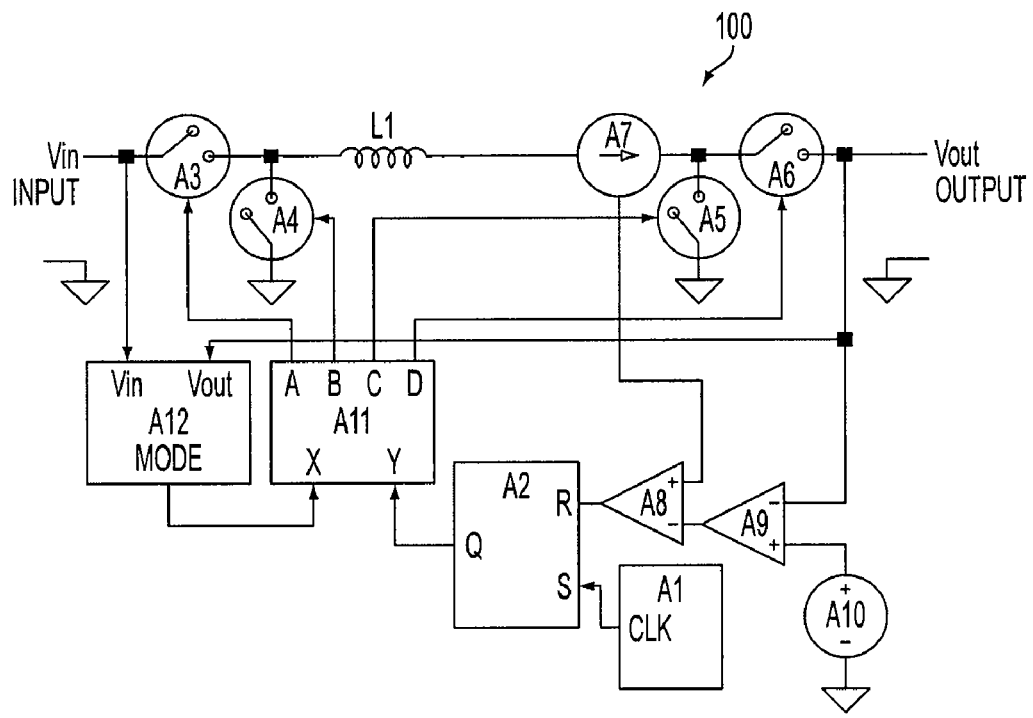
FIG. 3 is a diagram illustrating a first exemplary embodiment of a peak current control switching regulator of the present disclosure.

FIG. 3 illustrates an exemplary embodiment of a peak current control switching regulator 100 of the present disclosure, in which input and output voltages are monitored to provide switching between a buck mode and a boost mode. The switching regulator 100 comprises the inductor L1 and the elements A1 to A10 of the solid-state flyback topology described above in connection with FIG. 1.

Further, the switching regulator 100 includes a voltage detection circuit A12 that monitors voltages Vin and Vout at the input and output of the regulator 100. The voltage detection circuit A12 may detect the following three conditions: 1) when the input voltage Vin is well above the output voltage Vout, 2) when the input voltage Vin is well below the output voltage Vout, and 3) when the input voltage Vin is close to the output voltage Vout.

The voltage detection circuit A12 may determine a difference between the input voltage Vin and output voltage Vout, and compare this difference with various pre-determined threshold voltages to produce mode signals at its Mode output. When the Vin is above the Vout by more than a first threshold level Vth1, the voltage detection circuit A12 may produce a buck mode signal indicating that the Vin is well above the Vout. For example, the buck mode signal may be issued when the Vin is above the Vout by more than 0.5V. When the Vin is below the Vout by more than a second threshold level Vth2, the voltage detection circuit A12 may produce a boost mode signal indicating that the Vin is well below the Vout. For example, the boost mode signal may be issued when the Vin is below the Vout by more than 0.5V. Finally, when a difference between the Vin and Vout is less than a third threshold level Vth3, the voltage detection circuit A12 may produce a solid-state flyback mode signal indicating that the Vin is close to Vout. For example, the solid-state flyback mode signal may be issued when the Vin is within 0.5V with respect to Vout.

The output signal produced by the voltage detection circuit A12 is supplied to input X of a switch driver A11 having outputs A, B, C and D respectively connected to control terminals of switches A3, A4, A5 and A6. Also, the switch driver A11 is controlled by the output signal produced at the output Q of the flip-flop A2 and transferred to input Y of the switch driver A11. The switch driver A11 controls switching of the switches A3, A4, A5 and A6 in accordance with a mode signal received from the voltage detection circuit A12 and a control signal asserted at the output Q.

When the voltage detection circuit A12 produces a buck mode signal indicating that the Vin is well above the Vout, the switch driver A11 controls the switches A3-A6 so as to set the regulator 100 into a buck mode of operation. In particular, when the buck mode signal is asserted, the switch A6 is closed and the switch A5 is open. Further, when the buck mode signal is asserted and the flip-flop A2 is set by the clock signal CLK (i.e. output Q is in a TRUE state), the switch A3 is closed and the switch A4 is open. When the peak current in the inductor is ramped up to a predetermined level defined by the output of the error amplifier A9, the output of the voltage comparator A8 becomes TRUE resetting the flip-flop A2. In response, the switch A3 opens and the switch A4 closes. Hence, in response to a buck mode signal from the voltage detection circuit A12, the switching regulator 100 operates in a buck mode to reduce the input voltage Vin.

When the voltage detection circuit A12 produces a boost mode signal indicating that the Vin is well below the Vout, the switch driver A11 controls the switches A3-A6 so as to set the regulator 100 into a boost mode of operation. In particular, when the boost mode signal is asserted, the switch A3 is closed and the switch A4 is open. Further, when the boost mode signal is asserted and the flip-flop A2 is set by the clock signal CLK (i.e. output Q is in a TRUE state), the switch A5 is closed and the switch A6 is open. When the peak current in the inductor is ramped up to a predetermined level defined by the output of the error amplifier A9, the output of the voltage comparator A8 becomes TRUE resetting the flip-flop A2. In response, the switch A5 opens and the switch A6 closes. Hence, in response to a boost mode signal from the voltage detection circuit A12, the switching regulator 100 operates in a boost mode to increase the input voltage Vin.

When the voltage detection circuit A12 produces a solid-state flyback mode signal indicating that the Vin is close to the Vout, the switch driver A11 controls the switches A3-A6 so as to set the regulator 100 into a solid-state flyback mode of operation described above in connection with FIG. 1. In particular, when the flip-flop A2 is set by a clock pulse CLK, switches A3 and A5 are closed, and switches A4 and A6 are open. As a result, the inductor L1 is connected between the input of the regulator 100 and the ground. When the peak current in the inductor is ramped up to a level that causes the flip-flop A2 to reset, switches A3 and A5 open, and switches A4 and A6 close. In this case, the inductor L1 is connected between the output of the regulator 100 and the ground. Hence, the solid-state flyback mode enables switching between the buck mode and the boost mode in the peak current control regulator 100.

Figure 4:
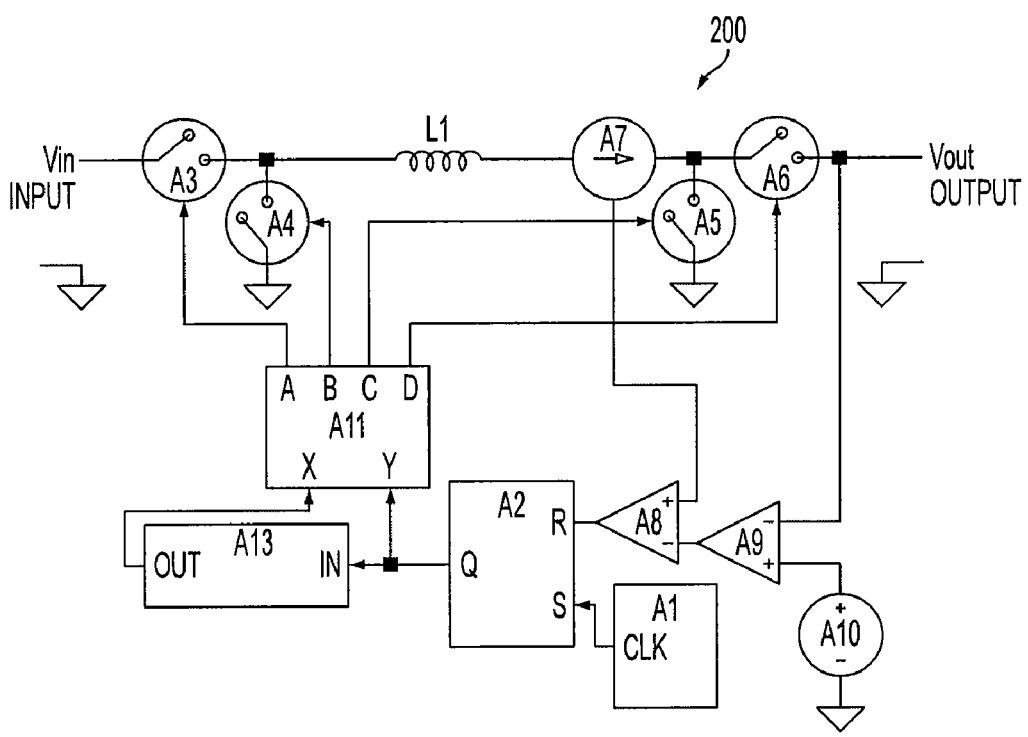
FIG. 4 is a diagram illustrating a second exemplary embodiment of a peak current control switching regulator of the present disclosure.

FIG. 4 illustrates another exemplary embodiment of the present disclosure, in which a peak current control switching regulator 200 switches between buck and boost modes using duty cycle control. The switching regulator 200 comprises the inductor L1 and the elements A1 to A10 of the solid-state flyback topology described above in connection with FIG. 1.

Further, the switching regulator 200 includes a duty cycle detector A13 that determines the duty cycle of the signal at the output Q of the flip-flop A2. A switch driver A11 has inputs X and Y, and outputs A, B, C and D for respectively controlling switches A3, A4, A5 and A6 so as to support operations of the switching regulator 200 in a buck, boost and solid-state flyback modes. The switch driver A11 is controlled based on a mode control signal supplied by the duty cycle detector A13 to the input X and based on the output signal of the flip-flop A2 provided at the input Y.

In particular, the duty cycle detector A13 may compare the duty cycle D received at its input IN from the output Q of the flip-flop A2 with four pre-determined threshold values Dth1, Dth2, Dth3 and Dth4, where Dth1>Dth2>Dth3>Dth4. For example, Dth1=90%, Dth2=55%, Dth3=45% and Dth4=10%. When the duty cycle D is above the Dth1 (in a buck mode) or below the Dth4 (in a boost mode), the duty cycle detector A13 asserts at its output OUT a solid-state flyback mode signal requesting the switch driver A11 to control switches A3 to A6 so as to set the switching regulator 200 into a solid-state flyback mode. In this mode, when the flip-flop A2 is set by a clock pulse CLK, switches A3 and A5 are closed, and switches A4 and A6 are open to connect the inductor L1 between the input of the regulator 200 and the ground. When the peak current in the inductor is ramped up to a level that causes the flip-flop A2 to reset, switches A3 and A5 open, and switches A4 and A6 close to connect the inductor L1 between the output of the regulator 100 and the ground.

When the duty cycle D in the solid-state flyback mode is below the Dth3, the duty cycle detector A13 asserts a buck mode signal requesting the switch driver A11 to control switches A3 to A6 so as to set the switching regulator 200 into a buck mode. In this mode, the switch A6 is closed and the switch A5 is open. Further, when the buck mode signal is asserted and the flip-flop A2 is set by the clock signal CLK (i.e. output Q is in a TRUE state), the switch A3 is closed and the switch A4 is open. When the peak current in the inductor is ramped up to a predetermined level defined by the output of the error amplifier A9, the output of the voltage comparator A8 becomes TRUE resetting the flip-flop A2. In response, the switch A3 opens and the switch A4 closes.

When the duty cycle D in the solid-state flyback mode is above the Dth2, the duty cycle detector A13 asserts a boost mode signal requesting the switch driver A11 to control switches A3 to A6 so as to set the switching regulator 200 into a boost mode. In this mode, the switch A3 is closed and the switch A4 is open. Further, when the boost mode signal is asserted and the flip-flop A2 is set by the clock signal CLK, the switch A5 is closed and the switch A6 is open. When the peak current in the inductor is ramped up to a predetermined level, the output of the voltage comparator A8 becomes TRUE resetting the flip-flop A2. In response, the switch A5 opens and the switch A6 closes.

Hence, the solid-state flyback topology of the present disclosure may provide transitions between the boost and buck modes based on the duty cycle of the switching control signal.

A typical switching regulator operates by repeatedly turning a power switch on and off. Due to the switching nature of the power transistor drive, the efficiency of a typical switch-mode circuit falls off as the load decreases, since a fixed amount of power is wasted in the drive circuitry regardless of load. One method used to avoid this efficiency loss at light loads is to omit switching cycles when the load is light. This mode of operation is referred to as Burst Mode®. For example, the Burst Mode is described in U.S. Pat. Nos. 5,481, 178, 6,307,356, and 6,580,258 issued to Linear Technology, the assignee of the present application.

Figure 5:
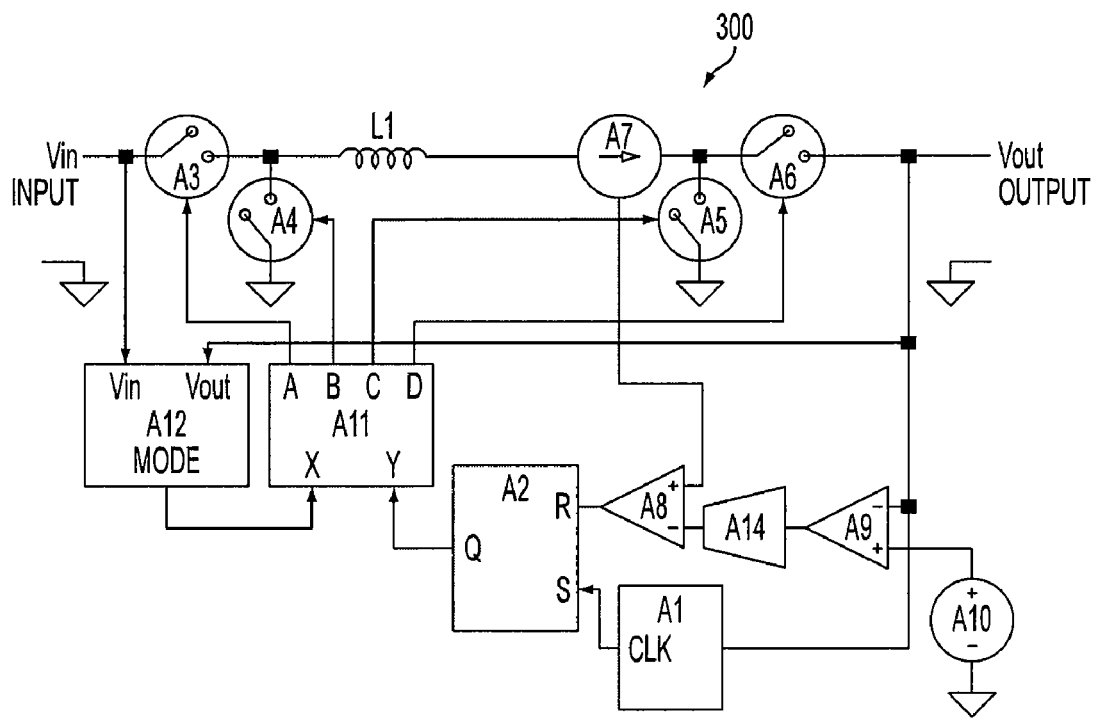
FIG. 5 is a diagram illustrating a third exemplary embodiment of a peak current control switching regulator of the present disclosure.
Figure 6:
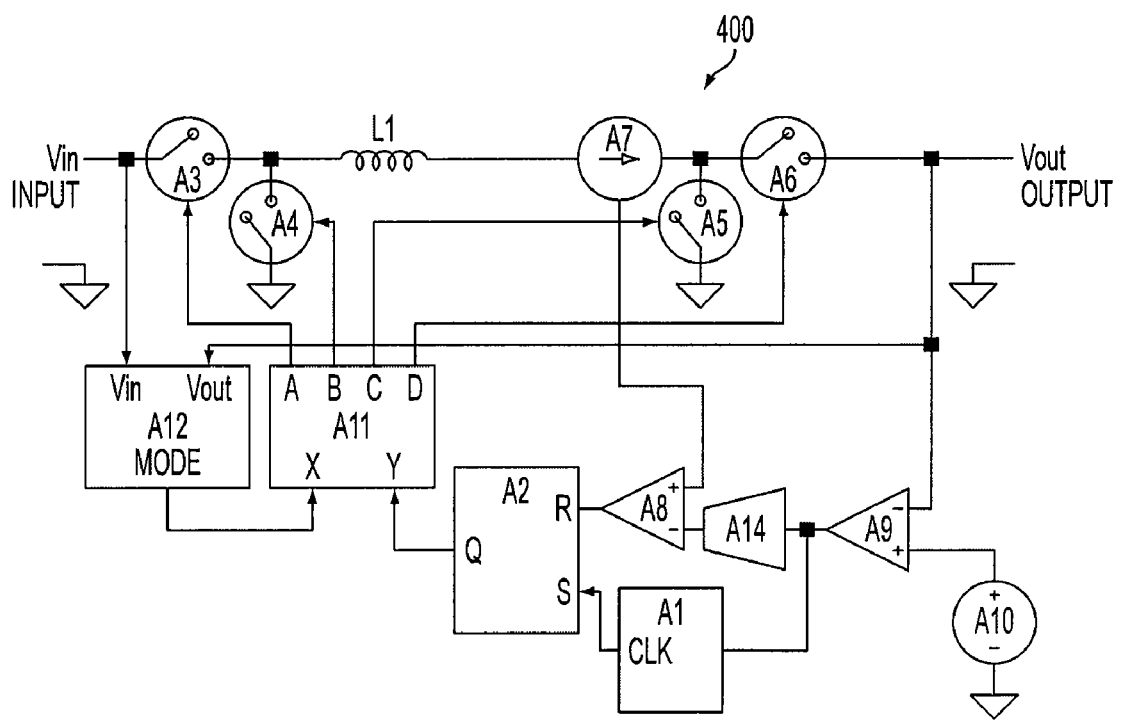
FIG. 6 is a diagram illustrating a fourth exemplary embodiment of a peak current control switching regulator of the present disclosure.

FIGS. 5 and 6 illustrate that the solid-state flyback topology of the present disclosure enables a buck-boost switching regulator to operate in the Burst Mode. In particular, FIG. 5 shows an exemplary embodiment of a Burst Mode current peak control buck-boost switching regulator 300 of the present disclosure that comprises the inductor L1 and the elements A1 to A10 of the solid-state flyback topology described above in connection with FIG. 1. For example, the switching regulator 300 may switch between a buck mode and a boost mode by monitoring the input voltage Vin and the output voltage Vout. The switching regulator 300 may include a voltage detection circuit A12 and a switch driver A11 that operate in a manner similar to operation of the voltage detection circuit A12 and the switch driver A11 in FIG. 3.

The error amplifier A9 compares the voltage Vout at the output of the regulator 300 with a reference voltage Vref provided by the reference voltage source A10. To provide the Burst Mode operation, the non-inverting input of the error amplifier A9 is connected to the clock A1 to disable or enable supplying the clock signal CLK to the S input of the flip-flop A2. In particular, the clock A1 may be disabled when the output voltage Vout is higher than a pre-set level selected to indicate that a light load is connected to the output of the switching regulator 300. The clock A1 may be enabled to resume supplying clock signals CLK to the S input of the flip-flop A2 when the output voltage Vout reduces to a pre-determined level that may differ from the level used to disable the clock A1.

Further, the switching regulator 300 may include a voltage limiter A14 connected between the output of the error amplifier A9 and the inverting input of the voltage comparator A8.

The non-inverting input of the voltage comparator A8 is supplied by the current sensor A7 with a voltage corresponding to the peak current in the inductor L1. The voltage limiter A14 limits the voltage at the inverting input of A8 to a pre-selected level so as to prevent the peak current in the inductor L1 from being too low.

The voltage detection circuit A12 may determine a difference between the input and output voltages, and compare this difference with various pre-determined threshold voltages. When the Vin is above the Vout by more than a first threshold level Vth1, the voltage detection circuit A12 may produce a buck mode signal indicating that the Vin is well above the Vout. When the Vin is below the Vout by more than a second threshold level Vth2, the voltage detection circuit A12 may produce a boost mode signal indicating that the Vin is well below the Vout. Finally, when a difference between the Vin and Vout is less than a third threshold level Vth3, the voltage detection circuit A12 may produce a solid-state flyback mode signal indicating that the Vin is close to Vout.

The output signal produced by the voltage detection circuit A12 is supplied to the switch driver A11 having outputs A, B, C and D respectively connected to control terminals of switches A3, A4, A5 and A6. Also, the switch driver A11 is controlled by the output signal produced at the output Q of the flip-flop A2. The switch driver A11 controls switching of the switches A3, A4, A5 and A6 in accordance with a mode signal received from the voltage detection circuit A12 and a control signal asserted at the output Q.

When the voltage detection circuit A12 produces a buck mode signal indicating that the Vin is well above the Vout, the switch driver A11 closes the switch A6 and opens the switch A5. Further, when the buck mode signal is asserted and the flip-flop A2 is set by the clock signal CLK (i.e. output Q is in a TRUE state), the switch A3 is closed and the switch A4 is open. When the peak current in the inductor is ramped up to a predetermined level, the output of the voltage comparator A8 becomes TRUE resetting the flip-flop A2. In response, the switch A3 opens and the switch A4 closes.

When the voltage detection circuit A12 produces a boost mode signal indicating that the Vin is well below the Vout, the switch driver A11 closes the switch A3 and opens the switch A4. Further, when the boost mode signal is asserted and the flip-flop A2 is set by the clock signal CLK (i.e. output Q is in a TRUE state), the switch A5 is closed and the switch A6 is open. When the peak current in the inductor is ramped up to a predetermined level, the output of the voltage comparator A8 becomes TRUE resetting the flip-flop A2. In response, the switch A5 opens and the switch A6 closes.

When the voltage detection circuit A12 produces a solid-state flyback mode signal indicating that the Vin is close to the Vout, the switch driver A11 controls the switches A3-A6 so as to set the regulator 300 into a solid-state flyback mode of operation described above in connection with FIG. 1. In particular, when the flip-flop A2 is set by a clock pulse CLK, switches A3 and A5 are closed, and switches A4 and A6 are open to connect the inductor L1 between the input of the regulator 300 and the ground. When the peak current in the inductor is ramped up to a level that causes the flip-flop A2 to reset, switches A3 and A5 open, and switches A4 and A6 close to connect the inductor L1 between the output of the regulator 300 and the ground.

In all modes of operation, the switches A4 and A6 should be controlled to prevent the current from flowing from the output of the switching regulator 300 through the inductor L1 to the ground. For example, the switch driver A11 may control the switches A4 and A6 so as to open them when the current flowing to the output of the regulator 300 is about to reverse its direction. Alternatively, the switches A4 and A6 may be implemented using unidirectional devices, such as diodes, that prevent the current from passing from the output of the regulator 300 to the inductor L1, and from the inductor L1 to the ground.

FIG. 6 illustrates another exemplary embodiment of a Burst Mode current peak control buck-boost switching regulator 400 of the present disclosure. By contrast, with the regulator 300 described above in connection with FIG. 5, the regulator 400 provides the Burst Mode operation based on the output of the error amplifier A9 that compares the output voltage Vout with the reference voltage Vref. The output of the error amplifier A9 is connected to the clock A1 to disable or enable supplying the clock signal CLK to the S input of the flip-flop A2. In particular, when the output signal of the error amplifier A9 exceeds a predetermined value selected to indicate that a light load is connected to the output of the switching regulator 400, the clock A1 is disabled. The clock A1 may be enabled to resume supplying clock signals CLK to the S input of the flip-flop A2 when the output signal of the error amplifier A9 reduces to a pre-set value that may differ from the value used to disable the clock A1.

FIGS. 7-13 illustrate exemplary embodiments of the present disclosure, in which a peak current control switching regulator incorporates a transconductance control loop that adjusts a relation between the peak inductor current and the output voltage of the error amplifier in accordance with a mode of operation. In particular, when a peak current control switching regulator switches between a solid-state flyback mode and a buck or boost mode, a transient response at the output of the regulator may occur because the output signal of the error amplifier has to slew to a new value to keep the same regulation point. A transconductance control loop of the present disclosure adjusts a relation between the peak inductor current and the output voltage of the error amplifier in a solid-state flyback mode with respect to this relation in a buck or boost mode. As a result, the output signal of the error amplifier does not have to slew when the regulator switches between a solid-state flyback mode and a buck or boost mode. Therefore, during a transition of the regulator between a solid-state flyback mode and a buck or boost mode, a transient response at its output is substantially reduced or eliminated. Hence, the transconductance control loop of the present disclosure enables the regulator to provide better voltage regulation during transitions between a solid-state flyback mode and a buck or boost mode.

Figure 7:
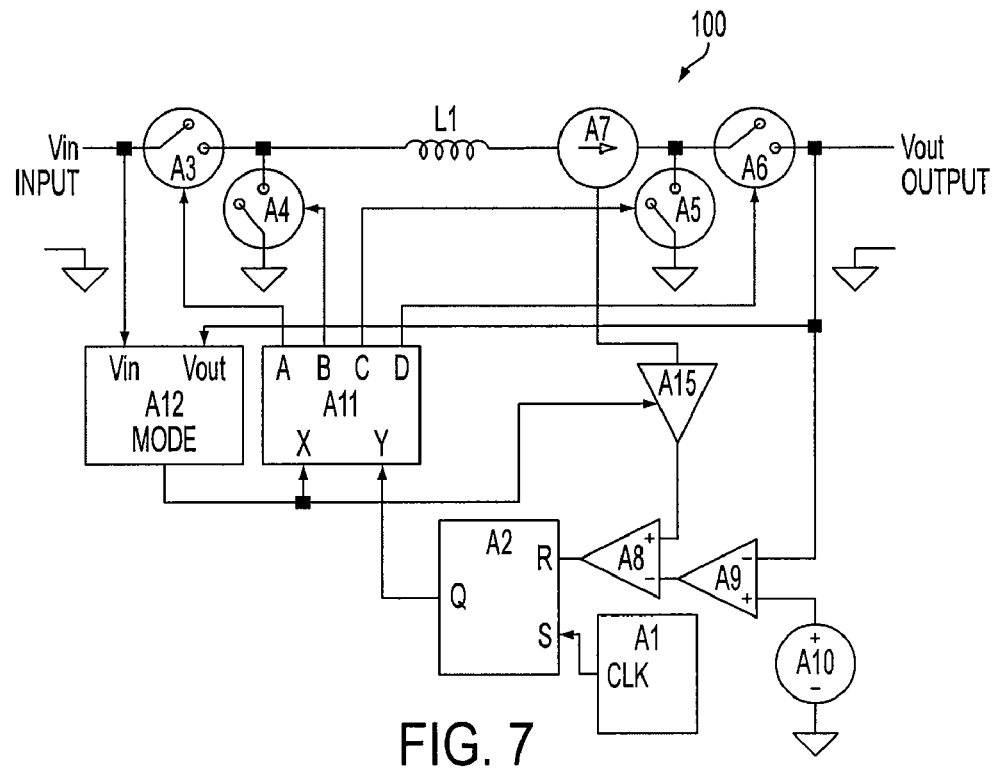
FIG. 7 is a diagram illustrating an exemplary transconductance control loop in the peak current control switching regulator shown in FIG. 3.

FIG. 7 illustrates an exemplary transconductance control loop in the peak current control switching regulator 100 shown in FIG. 3. The transconductance control loop includes a variable-gain amplifier A15 connected between the current sensor A7 and a non-inverting input of the voltage comparator A8. As discussed above, the current sensor A7 may produce a voltage representing a peak current in the inductor L1. An inverting input of the voltage comparator A8 is connected to an output of the error amplifier A9 that compares the voltage Vout at the output of the regulator 100 with a reference voltage Vref provided by the reference voltage source A10. Hence, the comparator A8 compares a signal representing the peak current in the inductor L1 with an error signal corresponding to a difference between the output voltage Vout and the reference voltage Vref.

A gain control input of the variable-gain amplifier A15 may be supplied with a mode signal produced at the Mode output of the voltage detection circuit A12. As discussed above, the voltage detection circuit A12 may determine a difference between the input voltage Vin and the output voltage Vout, and compare this difference with various pre-determined threshold voltages to produce mode signals at its Mode output. When the Vin is above the Vout by more than a first threshold level Vth1, the voltage detection circuit A12 may produce a buck mode signal indicating that the Vin is well above the Vout. For example, the buck mode signal at the Mode output may be issued when the Vin is above the Vout by more than 0.5V. When the Vin is below the Vout by more than a second threshold level Vth2, the voltage detection circuit A12 may produce a boost mode signal at the Mode output indicating that the Vin is well below the Vout. For example, the boost mode signal may be issued when the Vin is below the Vout by more than 0.5V. Finally, when a difference between the Vin and Vout is less than a third threshold level Vth3, the voltage detection circuit A12 may produce a solid-state flyback mode signal at the Mode output indicating that the Vin is close to Vout. For example, the solid-state flyback mode signal may be issued when the Vin is within 0.5V with respect to Vout.

The variable-gain amplifier A15 may be a voltage-controlled amplifier that varies its gain depending on a mode signal produced at the Mode output of the voltage detection circuit A12. In particular, when the solid-state flyback signal is produced at the Mode output, the gain of the amplifier A15 may be reduced approximately by a fraction of 2 with respect to the gain provided when a buck mode signal or a boost mode signal is supplied. For example, when a buck mode signal or a boost mode signal is provided to the gain control input of the amplifier A15, i.e. in a buck or boost mode, the gain of the amplifier A15 may be selected in the range between 6 and 8. When a solid-state flyback mode signal is produced at the Mode output of the voltage detection circuit A12, i.e. in a solid-state flyback mode of operation, the gain of the amplifier A15 may be reduced to a value in the range between 3 and 4.

Hence, in a solid-state flyback mode, the transconductance control loop in FIG. 7 may reduce the voltage at the non-inverting input of the voltage comparator A8 with respect to a buck or boost mode, so as to prevent the output voltage of the error amplifier A9 from needing to slew as much to keep the output in regulation. As a result, during a transition of the regulator 100 between a solid-state flyback mode and a buck or boost mode, a transient response at its output is substantially reduced or eliminated.

Figure 8:
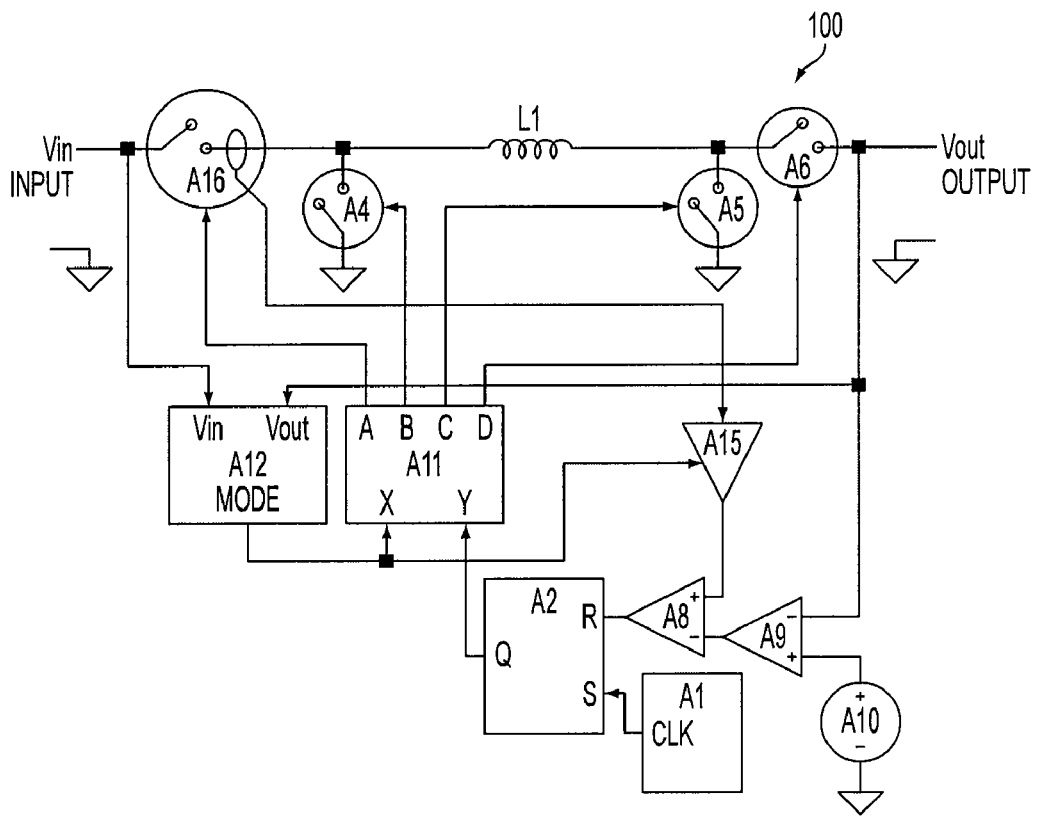
FIG. 8 is a diagram illustrating another exemplary embodiment of a transconductance control loop in the peak current control switching regulator shown in FIG. 3.

FIG. 8 illustrates another exemplary embodiment of a transconductance control loop in the peak current control switching regulator 100 shown in FIG. 3. Instead of sensing the inductor current using current sensor A7 coupled in series with the inductor L1, the regulator in FIG. 8 senses the current flowing through the input switch when the input switch is closed. Hence, the embodiment in FIG. 8 does not need the current sensor for determining the inductor current.

Further, instead of the input switch A3, the peak current control switching regulator in FIG. 8 contains a switch A16 coupled to connect the Vin input of the regulator to the inductor L1, and configured to produce at its output terminal, a value representing the current flowing through the switch A16. A variable-gain amplifier A15 is connected between the output terminal of the switch A16 and the non-inverting input of the voltage comparator A8.

The switch A16 is controlled by the switch driver A11 in the same manner as the switch driver A11 controls the input switch A3 in FIG. 3. In particular, switch A16, as well as the switches A4, A5 and A6 are controlled in accordance with a mode signal received from the voltage detection circuit A12 and a control signal asserted at the output Q of the flip-flop A2.

When the voltage detection circuit A12 produces a buck mode signal, the switch A6 is closed and the switch A5 is open. Further, when the buck mode signal is asserted and the flip-flop A2 is set by the clock signal CLK (i.e. output Q is in a TRUE state), the switch A16 is closed and the switch A4 is open. When the peak current in the inductor is ramped up to a predetermined level defined by the output of the error amplifier A9, the output of the voltage comparator A8 becomes TRUE resetting the flip-flop A2. In response, the switch A16 opens and the switch A4 closes. Hence, in response to a buck mode signal from the voltage detection circuit A12, the switching regulator in FIG. 8 operates in a buck mode to reduce the input voltage Vin.

When the voltage detection circuit A12 produces a boost mode signal, the switch A16 is closed and the switch A4 is open. Further, when the boost mode signal is asserted and the flip-flop A2 is set by the clock signal CLK (i.e. output Q is in a TRUE state), the switch A5 is closed and the switch A6 is open. When the peak current in the inductor is ramped up to a predetermined level defined by the output of the error amplifier A9, the output of the voltage comparator A8 becomes TRUE resetting the flip-flop A2. In response, the switch A5 opens and the switch A6 closes.

When the voltage detection circuit A12 produces a solid-state flyback mode signal, the switch driver A11 controls the switches A4, A5, A6 and A16 so as to set the regulator into a solid-state flyback mode of operation. In particular, when the flip-flop A2 is set by a clock pulse CLK, switches A16 and A5 are closed, and switches A4 and A6 are open. As a result, the inductor L1 is connected between the input of the regulator and the ground. When the peak current in the inductor is ramped up to a level that causes the flip-flop A2 to reset, switches A16 and A5 open, and switches A4 and A6 close. In this case, the inductor L1 is connected between the output of the regulator and the ground.

The switch A16 may be implemented by any circuit capable of supplying a signal representing the current flowing through the switch. For example, the switch A16 may be a circuit composed of a switch and a resistor connected in series to the switch. The voltage developed across the resistor when the switch is closed represents the current flowing through the switch. This voltage may be supplied via the variable-gain amplifier A15 to the non-inverting input of the voltage comparator A8.

Alternatively, the switch A16 may be implemented as a switching circuit with current mirror circuitry at its output. The current mirror circuitry may be configured to produce a signal representing the current flowing through the switch. In this case, the variable-gain amplifier A15 may be connected between the output of the current mirror circuitry and the non-inverting input of the voltage comparator A8.

The gain of the variable-gain amplifier A15 is controlled by the mode signal produced at the Mode output of the voltage detection circuit A12 to reduce the gain approximately by a factor of 2 when the solid-state flyback signal is produced at the Mode output compared to the gain provided when a buck mode signal or a boost mode signal is produced. For example, when a buck mode signal or a boost mode signal is supplied to the gain control input of the amplifier A15, i.e. in a buck or boost mode, the gain of the amplifier A15 may be selected in the range between 6 and 8. When a solid-state flyback mode signal is produced at the Mode output of the voltage detection circuit A12, i.e. in a solid-state flyback mode of operation, the gain of the amplifier A15 may be reduced to a value in the range between 3 and 4.

Figure 9:
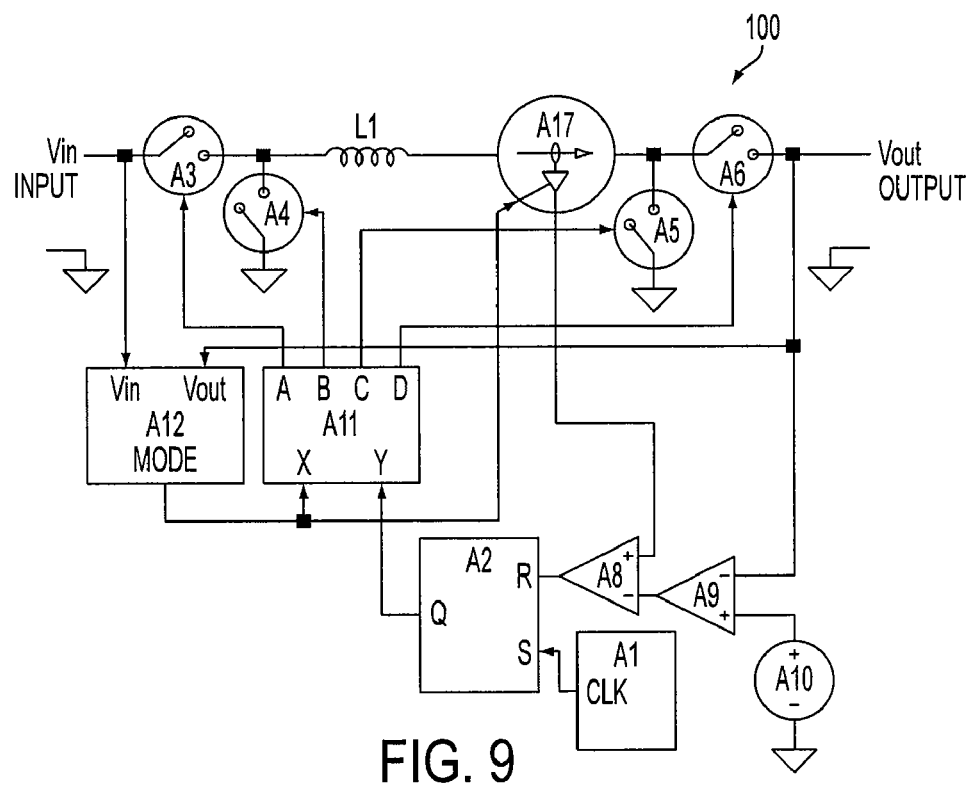
FIG. 9 is a diagram illustrating a further exemplary embodiment of a transconductance control loop in the peak current control switching regulator shown in FIG. 3.

FIG. 9 illustrates a further exemplary embodiment of a transconductance control loop in the peak current control switching regulator 100 shown in FIG. 3. Instead of the current sensor A7, the peak current control switching regulator in FIG. 9 contains a controlled current sensor A17 coupled to the inductor L1. The controlled current sensor A17 is configured to determine the current in the inductor L1 and produce an output signal representing the inductor current. The transfer function between the determined current value and the output signal of the sensor A17 may be controlled by the mode signal from the voltage detection circuit A12 to produce the output signal that varies depending on the mode of operation. The variable output signal of the controlled sensor A17 may be supplied to the non-inverting input of the voltage comparator A8. In particular, the value of the output signal in a solid-state flyback mode may be reduced approximately by a factor of 2 compared to the value of the output signal in a buck or boost mode.

For example, the controlled sensor A17 may be implemented using a circuit including a current sensor and a controlled switch that couples the sensor to one or more of resistors connected in parallel. The controlled switch may be controlled by the mode signal from the voltage detection circuit A8 to connect the current sensor to a resistor value selected for the corresponding mode of operation. The voltages developed across the resistors may be transferred to the non-inverting input of the voltage comparator A8. Values of the resistors may be selected so as to provide desired voltage values at the non-inverting input of the voltage comparator A8 in buck, boost and solid-state flyback modes of operation.

Figure 10:
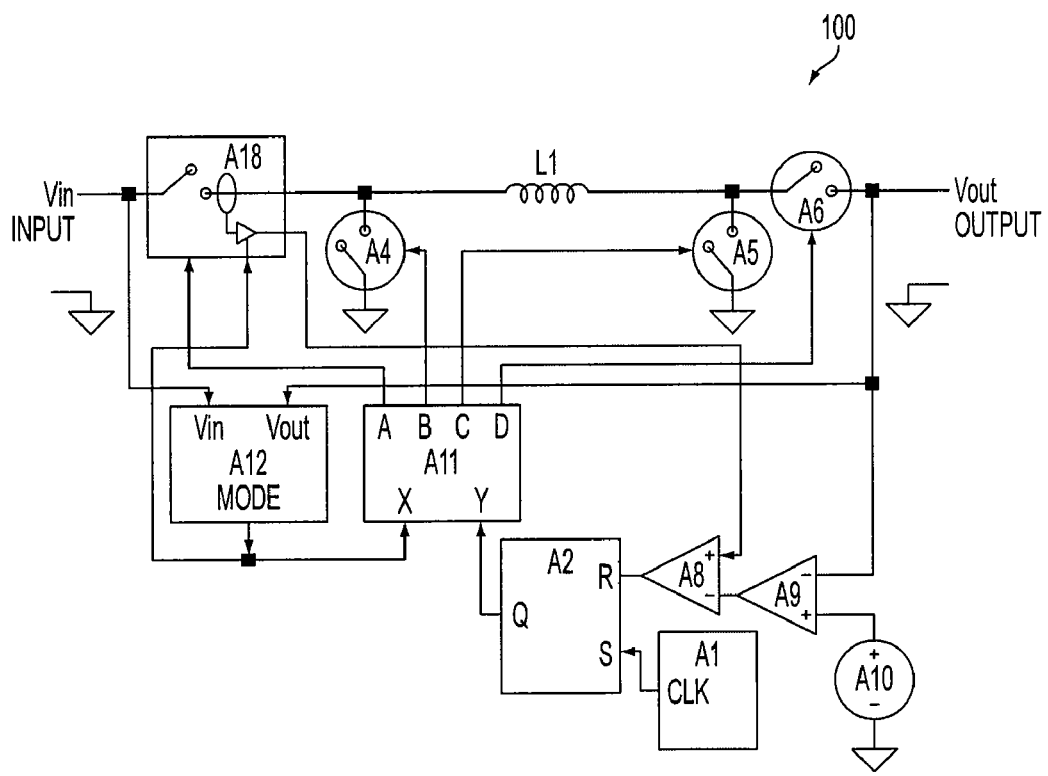
FIG. 10 is a diagram illustrating another exemplary embodiment of a transconductance control loop in the peak current control switching regulator shown in FIG. 3.

FIG. 10 illustrates another exemplary embodiment of a transconductance control loop in the peak current control switching regulator 100 shown in FIG. 3. Instead of sensing the inductor current using current sensor A7 coupled in series with the inductor L1, the regulator in FIG. 10 senses the current flowing through the input switch when the input switch is closed. Further, instead of the input switch A3, the peak current control switching regulator in FIG. 10 contains a switch A18 that connects the Vin input of the regulator to the inductor L1, and is configured to produce an output signal representing the current flowing through the switch A18.

Moreover, the switch A18 is configured so as to provide a controlled transfer function between the value of the current flowing through the switch A18, and the output signal of the switch A18. This transfer function may be controlled by the mode signal from the voltage detection circuit A12 to produce the output signal of the switch A18 that varies depending on the mode of operation. The variable output signal of the switch A18 may be supplied to the non-inverting input of the voltage comparator A8. In particular, the value of the output signal of the switch A18 in a solid-state flyback mode may be reduced approximately by a factor of 2 compared to the value of the output signal of the switch A18 in a buck or boost mode.

Switching of the switch A18 is controlled by the switch driver A11 in the same manner as the switch driver A11 controls the input switch A3 in FIG. 3. In particular, switching of the switch A18 is controlled in accordance with a mode signal received from the voltage detection circuit A12 and a control signal asserted at the output Q of the flip-flop A2.

When the voltage detection circuit A12 produces a buck mode signal, the switch A6 is closed and the switch A5 is open. Further, when the buck mode signal is asserted and the flip-flop A2 is set by the clock signal CLK, the switch A18 is closed and the switch A4 is open. When the peak current in the inductor is ramped up to a predetermined level defined by the output of the error amplifier A9, the output of the voltage comparator A8 becomes TRUE resetting the flip-flop A2. In response, the switch A18 opens and the switch A4 closes.

When the voltage detection circuit A12 produces a boost mode signal, the switch A18 is closed and the switch A4 is open. Further, when the boost mode signal is asserted and the flip-flop A2 is set by the clock signal CLK, the switch A5 is closed and the switch A6 is open. When the peak current in the inductor is ramped up to a predetermined level defined by the output of the error amplifier A9, the output of the voltage comparator A8 becomes TRUE resetting the flip-flop A2. In response, the switch A5 opens and the switch A6 closes.

When the voltage detection circuit A12 produces a solid-state flyback mode signal, the switch driver A11 controls the switches A4, A5, A6 and A18 so as to set the regulator into a solid-state flyback mode of operation. In particular, when the flip-flop A2 is set by a clock pulse CLK, switches A18 and A5 are closed, and switches A4 and A6 are open. As a result, the inductor L1 is connected between the input of the regulator and the ground. When the peak current in the inductor is ramped up to a level that causes the flip-flop A2 to reset, switches A18 and A5 open, and switches A4 and A6 close. In this case, the inductor L1 is connected between the output of the regulator and the ground.

The switch A18 may be implemented by any switching circuit capable of providing a controlled value of an output signal representing the current in the switch. For example, the switch A18 may be a switching circuit having a switch connectable to multiple current mirrors provided at the output of the switching circuit. The connection between the switch and the current mirrors may be controlled so as to connect the switch to a predetermined number of current mirrors in a particular mode of operation. For example, in the buck or boost mode, the switch may be connected to a pair of current mirrors, whereas in a solid-state flyback mode, the switch may be connected to a single current mirror.

Figure 11:
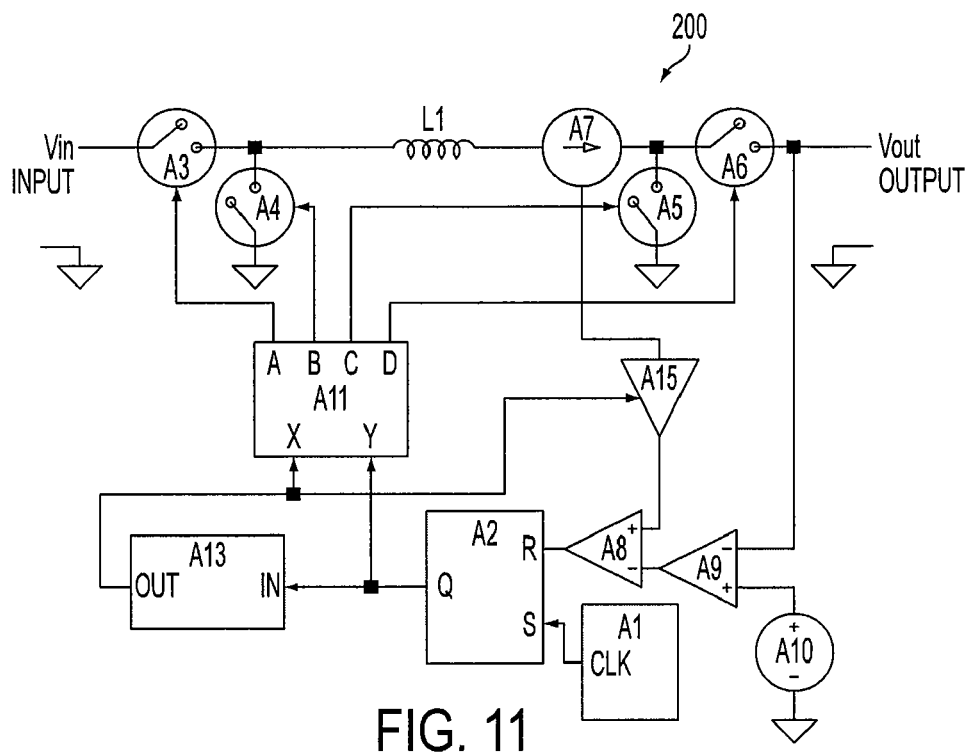
FIG. 11 is a diagram illustrating an exemplary transconductance control loop in the peak current control switching regulator shown in FIG. 4.

FIG. 11 illustrates an exemplary transconductance control loop in the peak current control switching regulator 200 shown in FIG. 4. The transconductance control loop includes a variable-gain amplifier A15 connected between the current sensor A7 and a non-inverting input of the voltage comparator A8. As discussed above, the current sensor A7 may produce a voltage representing a peak current in the inductor L1. An inverting input of the voltage comparator A8 is connected to an output of the error amplifier A9 that compares the voltage Vout at the output of the regulator 200 with a reference voltage Vref provided by the reference voltage source A10. Hence, the comparator A8 compares a signal representing the peak current in the inductor L1 with an error signal corresponding to a difference between the output voltage Vout and the reference voltage Vref. The output of the comparator A8 is used to reset the flip-flop A2, which is set by the clock signal CLK produced by the clock oscillator A1.

A gain control input of the variable-gain amplifier A15 may be supplied with a mode signal produced by the duty cycle detector A13 based on the duty cycle of the signal at the output Q of the flip-flop A2. In particular, as discussed above, the duty cycle detector A13 may compare the duty cycle D received at its input IN from the output Q of the flip-flop A2 with four pre-determined threshold values Dth1, Dth2, Dth3 and Dth4, where Dth1>Dth2>Dth3>Dth4. For example, Dth1=90%, Dth2=55%, Dth3=45% and Dth4=10%. When the duty cycle D is above the Dth1 (in a buck mode) or below the Dth4 (in a boost mode), the duty cycle detector A13 asserts at its output OUT a solid-state flyback mode signal. When the duty cycle D in the solid-state flyback mode is below the Dth3, the duty cycle detector A13 asserts a buck mode signal. When the duty cycle D in the solid-state flyback mode is above the Dth2, the duty cycle detector A13 asserts a boost mode signal.

The variable-gain amplifier A15 may be a voltage-controlled amplifier that varies its gain depending on a mode signal produced at the output of the duty cycle detector A13. In particular, when the solid-state flyback signal is asserted at the output of the duty cycle detector A13, the gain of the amplifier A15 may be reduced approximately by a fraction of 2 with respect to the gain provided when a buck mode signal or a boost mode signal is asserted. For example, when a buck mode signal or a boost mode signal is provided to the gain control input of the amplifier A15, i.e. in a buck or boost mode, the gain of the amplifier A15 may be selected in the range between 6 and 8. When a solid-state flyback mode signal is produced at the Mode output of the voltage detection circuit A12, i.e. in a solid-state flyback mode of operation, the gain of the amplifier A15 may be reduced to a value in the range between 3 and 4.

As one skilled in the art would realize, a transconductance control loop in the peak current control switching regulator 200 shown in FIG. 4 may also be configured in the manner similar to the transconductance control loops illustrated in FIGS. 8, 9 and 10. However, a mode signal for providing the transconductance control would be supplied from the duty cycle detector A13, instead of the voltage detection circuit A12.

Figure 12:
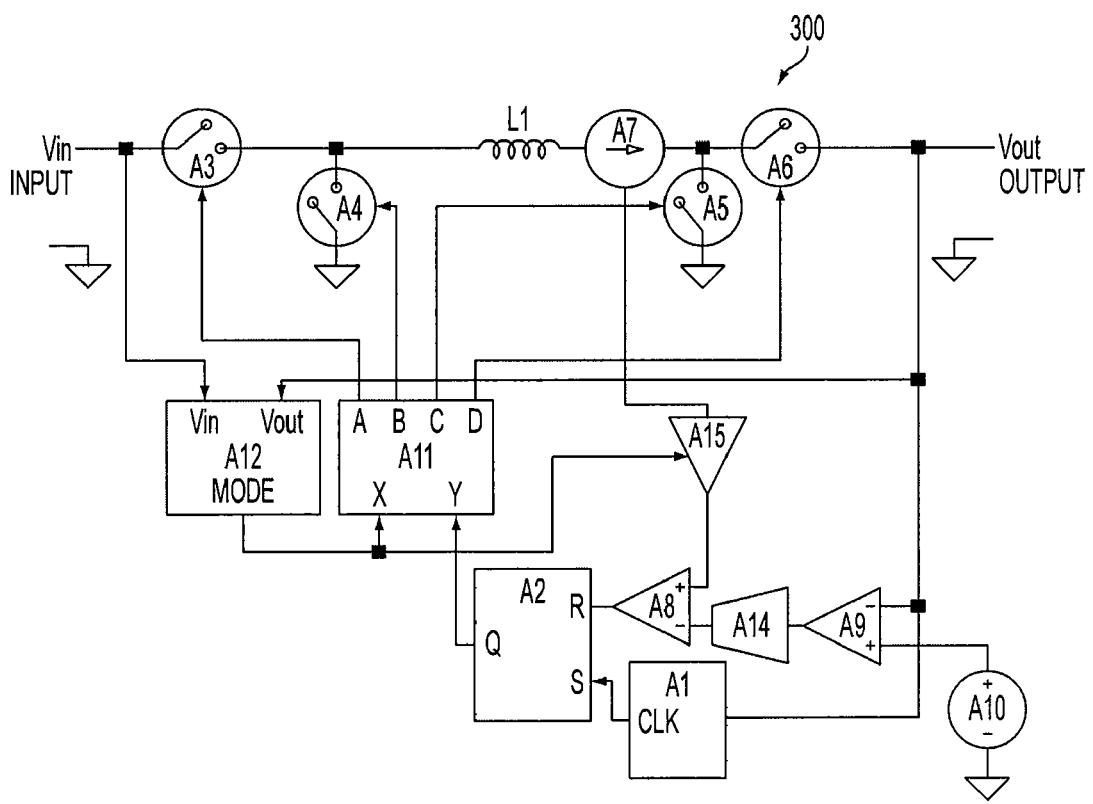
FIG. 12 is a diagram illustrating an exemplary transconductance control loop in the peak current control switching regulator shown in FIG. 5.

FIG. 12 illustrates an exemplary transconductance control loop in the Burst Mode peak current control switching regulator 300 shown in FIG. 5. The transconductance control loop includes a variable-gain amplifier A15 connected between the current sensor A7 and a non-inverting input of the voltage comparator A8. The current sensor A7 may produce a voltage representing a peak current in the inductor L1. The inverting input of the voltage comparator A8 is connected to the output of the error amplifier A9 via the voltage limiter A14 that limits the voltage at the inverting input of A8 to a pre-selected level so as to prevent the peak current in the inductor L1 from being too low.

The error amplifier A9 compares the output voltage Vout with a reference voltage Vref supplied by the reference voltage source A10. To provide the Burst Mode operation, the non-inverting input of the error amplifier A9 is connected to the clock A1 to disable or enable supplying the clock signal CLK to the S input of the flip-flop A2. In particular, the clock A1 may be disabled when the output voltage Vout is higher than a pre-set level selected to indicate that a light load is connected to the output of the switching regulator 300. The clock A1 may be enabled to resume supplying clock signals CLK to the S input of the flip-flop A2 when the output voltage Vout reduces to a pre-determined level that may differ from the level used to disable the clock A1.

A gain control input of the variable-gain amplifier A15 may be supplied with a mode signal produced at the Mode output of the voltage detection circuit A12 that determines a difference between the input voltage Vin and the output voltage Vout, and compares this difference with various pre-determined threshold voltages to produce mode signals at its Mode output. When the Vin is above the Vout by more than a first threshold level Vth1, the voltage detection circuit A12 may produce a buck mode signal indicating that the Vin is well above the Vout. For example, the buck mode signal at the Mode output may be issued when the Vin is above the Vout by more than 0.5V. When the Vin is below the Vout by more than a second threshold level Vth2, the voltage detection circuit A12 may produce a boost mode signal at the Mode output indicating that the Vin is well below the Vout. For example, the boost mode signal may be issued when the Vin is below the Vout by more than 0.5V. Finally, when a difference between the Vin and Vout is less than a third threshold level Vth3, the voltage detection circuit A12 may produce a solid-state flyback mode signal at the Mode output indicating that the Vin is close to Vout. For example, the solid-state flyback mode signal may be issued when the Vin is within 0.5V with respect to Vout.

The variable-gain amplifier A15 may be a voltage-controlled amplifier that varies its gain depending on a mode signal produced at the Mode output of the voltage detection circuit A12. In particular, when the solid-state flyback signal is produced at the Mode output, the gain of the amplifier A15 may be reduced approximately by a fraction of 2 with respect to the gain provided when a buck mode signal or a boost mode signal is supplied. For example, when a buck mode signal or a boost mode signal is provided to the gain control input of the amplifier A15, i.e. in a buck or boost mode, the gain of the amplifier A15 may be selected in the range between 6 and 8. When a solid-state flyback mode signal is produced at the Mode output of the voltage detection circuit A12, i.e. in a solid-state flyback mode of operation, the gain of the amplifier A15 may be reduced to a value in the range between 3 and 4.

As one skilled in the art would realize, a transconductance control loop in the Burst Mode peak current control switching regulator 300 shown in FIG. 5 may also be configured in the manner similar to the transconductance control loops illustrated in FIGS. 8, 9 and 10.

Figure 13:
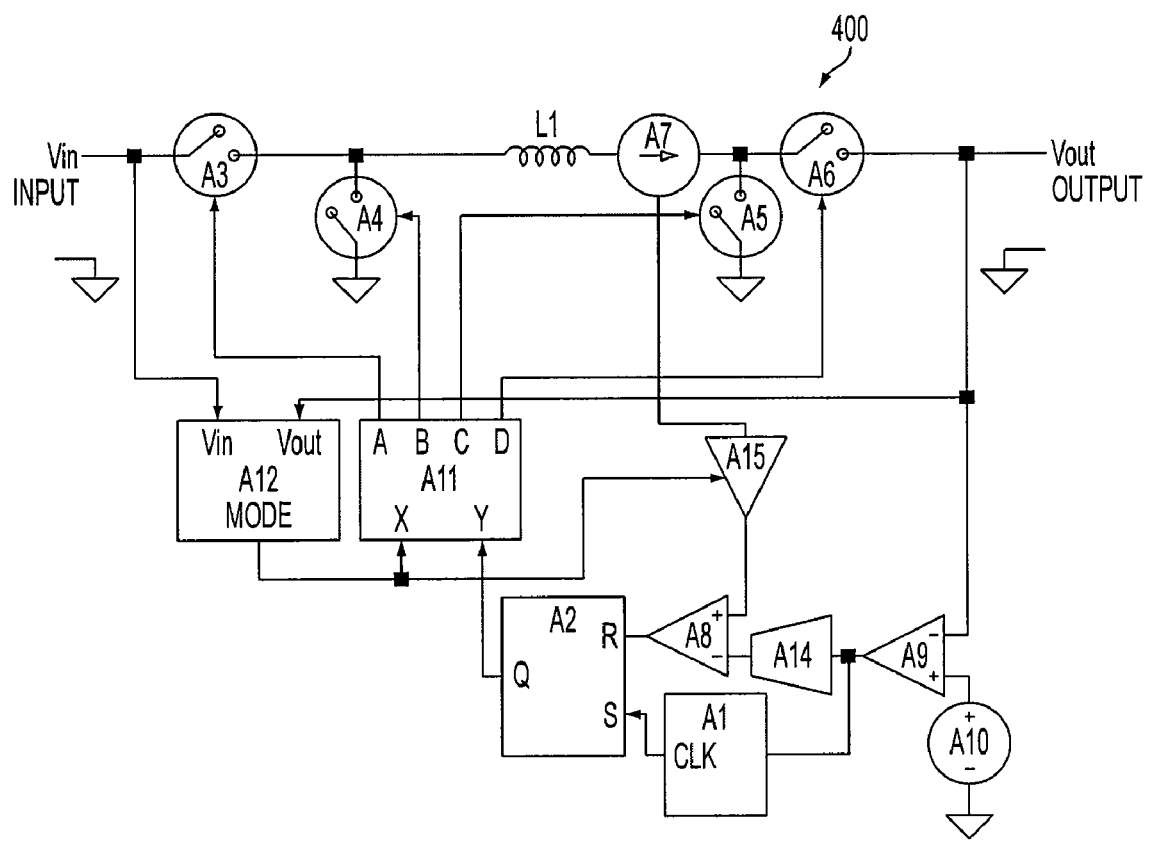
FIG. 13 is a diagram illustrating an exemplary transconductance control loop in the peak current control switching regulator shown in FIG. 6.

FIG. 13 illustrates an exemplary transconductance control loop in the Burst Mode peak current control switching regulator 400 shown in FIG. 6 that provides the Burst Mode operation based on the output of the error amplifier A9 that compares the output voltage Vout with the reference voltage Vref. The transconductance control loop includes a variable-gain amplifier A15 connected between the current sensor A7 and a non-inverting input of the voltage comparator A8. The current sensor A7 may produce a voltage representing a peak current in the inductor L1. The inverting input of the voltage comparator A8 is connected to the output of the error amplifier A9 via the voltage limiter A14 that limits the voltage at the inverting input of A8 to a pre-selected level so as to prevent the peak current in the inductor L1 from being too low.

A gain control input of the variable-gain amplifier A15 may be supplied with a mode signal produced at the Mode output of the voltage detection circuit A12 that determines a difference between the input voltage Vin and the output voltage Vout, and compares this difference with various pre-determined threshold voltages to produce buck mode, burst mode or solid-state flyback mode signals. The variable-gain amplifier A15 may be a voltage-controlled amplifier that varies its gain depending on a mode signal produced at the Mode output of the voltage detection circuit A12. In particular, when the solid-state flyback signal is produced at the Mode output, the gain of the amplifier A15 may be reduced approximately by a fraction of 2 with respect to the gain provided when a buck mode signal or a boost mode signal is supplied. For example, when a buck mode signal or a boost mode signal is provided to the gain control input of the amplifier A15, i.e. in a buck or boost mode, the gain of the amplifier A15 may be selected in the range between 6 and 8. When a solid-state flyback mode signal is produced at the Mode output of the voltage detection circuit A12, i.e. in a solid-state flyback mode of operation, the gain of the amplifier A15 may be reduced to a value in the range between 3 and 4.

As one skilled in the art would realize, a transconductance control loop in the Burst Mode peak current control switching regulator 400 shown in FIG. 6 may also be configured in the manner similar to the transconductance control loops illustrated in FIGS. 8, 9 and 10.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply system for producing a regulated output voltage at an output node in response to an input voltage at an input node, comprising:
   an inductive device,
   a plurality of switching devices for providing connection of the inductive device to the input and output nodes and a ground node,
   a switch driver circuit for driving the switching devices so as to enable the power supply to operate in a boost mode to increase the input voltage, in a buck mode to decrease the input voltage, and in a solid-state flyback mode to transfer between the boost mode and the buck mode, and
   a duty cycle detection circuit for providing the switch driver circuit with a mode control signal based on a duty cycle of a signal for controlling switching of the switching devices,
   in the solid-state flyback mode, the switching devices being configured to provide switching of the inductive device between an input state in which the inductive device is connected between the input node and the ground node, and an output state in which the inductive device is connected between the ground node and the output node,
   wherein the duty cycle detection circuit is configured for comparing the duty cycle with first, second, third and fourth threshold levels Dth1, Dth2, Dth3 and Dth4, respectively, where Dth1>Dth2>Dth3>Dth4.

2. The system of claim 1, further comprising control circuitry responsive to a current in the inductive device for controlling the switch driver circuit.

3. The system of claim 2, wherein the control circuitry is configured for controlling the switch driver circuit in the solid-state flyback mode based on a value of a peak current in the inductive device.

4. The system of claim 1, wherein the switching devices include:
   a first switching device for providing connection of the inductive device to the input node,
   a second switching device for providing a connection of the inductive device to the ground node,
   a third switching device for providing a connection of the inductive device to the ground node, and
   a fourth switching device for providing a connection of the inductive device to the output node.

5. The system of claim 4, wherein the first and third switching devices are transistor devices, and the second and fourth switching devices are diode devices.

6. The system of claim 4, wherein in the input state of the solid-state flyback mode, the first and third switching devices are in a closed state, and the second and fourth switching devices are in an open state.

7. The system of claim 6, wherein in the output state of the solid-state flyback mode, the first and third switching devices are in an open state, and the second and fourth switching devices are in a closed state.

8. The system of claim 2, wherein the switch driver circuit is configured for setting the input state of the solid-state flyback mode in response to a clock signal.

9. The system of claim 8, wherein the switch driver circuit is configured for setting the output state of the solid-state flyback mode based on a value of a peak current in the inductive device.

10. The system of claim 1, further comprising a signal detection circuit for providing the switch driver circuit with a mode control signal based on relationship between the input and output voltages.

11. The system of claim 10, wherein the voltage detection circuit is configured to provide a buck mode signal requesting the switch driver circuit to operate in the buck mode when the input voltage is above the output voltage by a first threshold value.

12. The system of claim 11, wherein the signal detection circuit is configured to provide a boost mode signal requesting the switch driver circuit to operate in the boost mode when the input voltage is below the output voltage by a second threshold value.

13. The system of claim 12, wherein the voltage detection circuit is configured to provide a solid-state flyback mode signal requesting the switch driver circuit to operate in the solid-state flyback mode when a difference between the input voltage and the output voltage is less than a third threshold value.

14. The system of claim 1, wherein the duty cycle detection circuit provides a solid-state flyback mode signal requesting the switch driver circuit to operate in the solid-state flyback mode when the duty cycle is above the first threshold level or below the fourth threshold level.

15. The system of claim 14, wherein the duty cycle detection circuit provides a buck mode signal requesting the switch driver circuit to operate in the buck mode when the duty cycle is below the third threshold level.

16. The system of claim 15, wherein the duty cycle detection circuit provides a boost mode signal requesting the switch driver circuit to operate in the boost mode when the duty cycle is above the second threshold level.

17. The system of claim 8, wherein providing of the clock signal is disabled in response to a signal indicating that a light load is connected to the output node.

18. The system of claim 17, wherein providing of the clock signal is disabled based on the output voltage.

19. The system of claim 17, wherein providing of the clock signal is disabled based on an output of an error amplifier that compares the output voltage with a reference voltage.

20. The system of claim 17, further comprising a limiter configured to limit the minimum peak value of the current in the inductive device.

21. The system of claim 17, wherein the switching devices prevent a current from flowing from the output node through the inductive device to the ground node.

22. A method of regulating an output voltage in response to an input voltage in a voltage regulator comprising an inductive element, comprising the steps of:

operating the voltage regulator in a buck mode to reduce the input voltage if the input voltage is above the output voltage, operating the voltage regulator in a boost mode to increase the input voltage if the input voltage is below the output voltage, operating the voltage regulator in a solid-state flyback mode during switching between the buck mode and the boost mode, in the solid-state flyback mode, the inductive element being switched using switching devices between an input state in which the inductive device is connected between an input of the voltage regulator and a common node, and an output state in which the inductive element is connected between the common node and an output of the voltage regulator, and providing a mode control signal based on a duty cycle of a signal for controlling switching of the switching devices, wherein the duty cycle is compared with first, second, third and fourth threshold levels Dth1, Dth2, Dth3 and Dth4, respectively, where Dth1>Dth2>Dth3>Dth4.

23. The method of claim 22, in which the inductive element is switched between the input state and the output state based on a value of a peak current in the inductive element.

24. A switching regulator for producing a regulated output voltage at an output node in response to an input voltage at an input node, comprising:

an inductive device, a plurality of switching devices for providing connection of the inductive device to the input and output nodes and a common node, a switch driver circuit for driving the switching devices so as to enable the power supply to operate in a solid-state flyback mode, in which the switching devices are configured to provide switching of the inductive device between an input state in which the inductive device is connected between the input node and the common node, and an output state in which the inductive device is connected between the common node and the output node, and a duty cycle detection circuit for providing the switch driver circuit with a mode control signal based on a duty cycle of a signal for controlling switching of the switching devices, wherein the duty cycle detection circuit is configured for comparing the duty cycle with first, second, third and fourth threshold levels Dth1, Dth2, Dth3 and Dth4, respectively, where Dth1>Dth2>Dth3>Dth4.

25. The switching regulator of claim 24, wherein the inductive device is switched between the input state and the output state based on a value of a peak current in the inductive device.

26. A power supply system operating in a buck mode and in a boost mode for producing a regulated output signal at an output node in response to an input signal at an input node, comprising:

an inductive device, a switching circuitry configured for providing connection of the inductive device to support operation in the buck mode and in the boost mode, the switching circuitry being configured to enable the system to operate in an intermediate mode of operation between the buck mode and the boost mode, an error amplifier for comparing the output voltage with a reference voltage to produce an error signal, a comparator responsive to the error signal and a peak current in the inductor to control the output signal, a transconductance control loop for controlling a relation between the peak current and an output signal of the error amplifier in accordance with a mode of operation, and a current sensor coupled to the inductive device for sensing the peak current in the inductive device, wherein the transconductance control loop includes a variable-gain amplifier coupled between the current sensor and the comparator, and having a gain adjusted when the system switches between the intermediate mode and the buck or boost mode.

27. The system of claim 26, wherein the transconductance control loop is configured for adjusting the relation between the peak current and the output signal of the error amplifier when the system switches between the intermediate mode and the buck or boost mode.

28. The system of claim 26, wherein in the intermediate mode, the switching circuitry is configured to provide switching of the inductive device between an input state in which the inductive device is connected between the input node and the ground node, and an output state in which the inductive device is connected between the ground node and the output node.

29. The system of claim 28, wherein the switching circuitry includes an input switching circuit coupled to connect the input node to the inductive element, and configured to supply the comparator with an output value representing a current in the input switching circuit, the output value being adjusted when the system switches between the intermediate mode and the buck or boost mode.

30. The system of claim 28, wherein the transconductance control loop is configured so as to reduce a value of a peak inductor current signal supplied to the comparator in the intermediate mode compared to the peak inductor current signal supplied in the buck or boost mode.

31. A method of regulating an output voltage in response to an input voltage in a voltage regulator comprising an inductive element and an error amplifier for comparing the voltage signal with a reference voltage, comprising the steps of:

operating the voltage regulator in a buck mode to reduce the input voltage if the input voltage is above the output voltage, operating the voltage regulator in a boost mode to increase the input voltage if the input voltage is below the output voltage, operating the voltage regulator in an intermediate mode during switching between the buck mode and the boost mode, and adjusting a relation between a peak current in the inductive element and an output signal of the error amplifier when the voltage regulator switches between the intermediate mode and the buck or boost mode, wherein the adjusting step includes adjusting a gain of an amplifier that amplifies a signal representing the peak current in the inductive element.

32. The method of claim 31, wherein in the intermediate mode, the inductive element is switched between an input state in which the inductive element is connected between an input of the voltage regulator and a common node, and an output state in which the inductive element is connected between the common node and an output of the switching regulator.

33. The method of claim 31, wherein the adjusting step is carried out so as to reduce a value of a peak current signal representing the peak current in the inductive element, when the voltage regulator switches from the buck or boost mode into the intermediate mode.

34. A power supply system operating in a buck mode and in a boost mode for producing a regulated output signal at an output node in response to an input signal at an input node, comprising:
an inductive device,
a switching circuitry configured for providing connection of the inductive device to support operation in the buck mode and in the boost mode, the switching circuitry being configured to enable the system to operate in an intermediate mode of operation between the buck mode and the boost mode,
an error amplifier for comparing the output voltage with a reference voltage to produce an error signal,
a comparator responsive to the error signal and a peak current in the inductor to control the output signal, and
a transconductance control loop for controlling a relation between the peak current and an output signal of the error amplifier in accordance with a mode of operation,
wherein the switching circuitry includes an input switching circuit coupled to connect the input node and the inductive device, and configured to produce a value representing a current flowing through the input switching circuit, and the transconductance control loop includes a variable-gain amplifier coupled between the input switching circuit and the comparator, and having a gain adjusted when the system switches between the intermediate mode and the buck or boost mode.

35. A method of regulating an output voltage in response to an input voltage in a voltage regulator comprising an inductive element and an error amplifier for comparing the voltage signal with a reference voltage, comprising the steps of:
operating the voltage regulator in a buck mode to reduce the input voltage if the input voltage is above the output voltage,
operating the voltage regulator in a boost mode to increase the input voltage if the input voltage is below the output voltage,
operating the voltage regulator in an intermediate mode during switching between the buck mode and the boost mode, and
adjusting a relation between a peak current in the inductive element and an output signal of the error amplifier when the voltage regulator switches between the intermediate mode and the buck or boost mode,
wherein the adjusting step includes adjusting a gain of an amplifier that amplifies a signal representing a current in a switching circuit that connects an input of the voltage regulator to the inductive element.

* * * * *